US012801851B2

(12) United States Patent
Choi et al.

(10) Patent No.: US 12,801,851 B2
(45) Date of Patent: Nov. 17, 2026

(54) KNOWLEDGE-CONSTRAINED TREE SEARCH DECODING WITH TOKEN-LEVEL HALLUCINATION DETECTION

(71) Applicant: The Hong Kong University of Science and Technology, Hong Kong (CN)

(72) Inventors: Sehyun Choi, Hong Kong (CN); Tianqing Fang, Hong Kong (CN); Zhaowei Wang, Hong Kong (CN); Yangqiu Song, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 129 days.

(21) Appl. No.: 18/887,048

(22) Filed: Sep. 17, 2024

(65) Prior Publication Data

US 2025/0117583 A1 Apr. 10, 2025

Related U.S. Application Data

(60) Provisional application No. 63/588,297, filed on Oct. 6, 2023.

(51) Int. Cl.
*G06F 40/284* (2020.01)
*G06F 16/355* (2025.01)

(52) U.S. Cl.
CPC .......... *G06F 40/284* (2020.01); *G06F 16/355* (2019.01)

(58) Field of Classification Search
CPC ........... G06F 16/3329; G06F 16/33295; G06F 16/3344; G06F 16/2455; G06F 16/285;
(Continued)

(56) References Cited

U.S. PATENT DOCUMENTS 11,741,306 B2 * 8/2023 Galley ..................... G06N 3/08
704/9
11,847,424 B1 * 12/2023 Harkous ................ G06N 20/00
(Continued)

FOREIGN PATENT DOCUMENTS

CN 117113937 A 11/2023
CN 117217233 A 12/2023

OTHER PUBLICATIONS

Liu, etc "A Token-level Reference-free Hallucination Detection Benchmark for Free-form Text Generation", Proc. of the 60th Annual Meeting of the Association for computational Linguistics, vol. 1, pp. 6723-6737 (Year: 2022).*
(Continued)

*Primary Examiner* — Leshui Zhang
(74) *Attorney, Agent, or Firm* — IDEA Intellectual Limited; Sam T. Yip

(57) ABSTRACT

Provided herein is a novel method named Knowledge-Constrained Tree Search Decoding (KCTS) is provided, which is a first discriminator-guided constrained decoding approach to knowledge-grounded generation. The KCTS method also employs a Monte-Carlo Tree Search decoding (MCTS) instead of conventional LM decoding methods, which re-orders each token's importance based on the estimated future faithfulness starting from that token with multiple simulations. Coupled with a novel token-level hallucination detection method, RIPA (Reward Inflection Point Approximation), trained to predict the starting point of the hallucinating token, enabling effective adaptation of the knowledge classifier defined on the sequence level to the token level, this novel method is able to greatly mitigate hallucination problems of LLMs without the need of fine-tuning, thereby preventing the incurrence of high computational costs.

3 Claims, 2 Drawing Sheets

(58) Field of Classification Search
CPC ............. G06F 16/243; G06F 16/90332; G06F 16/334; G06F 16/35; G06F 16/355; G06F 16/345; G06F 16/24578; G06F 40/35; G06F 40/30; G06F 40/284; G06F 40/40; G06F 40/205; G06F 40/166; G06F 40/20; G06F 40/211; G06N 20/00; G06N 3/0455; G06N 3/0475
USPC .......................................................... 704/1-9
See application file for complete search history.

(56) References Cited

U.S. PATENT DOCUMENTS

| | | | | |
|---|---|---|---|---|
| 2022/0398071 | A1* | 12/2022 | Allamanis | G06N 3/084 |
| 2023/0274086 | A1* | 8/2023 | Tunstall-Pedoe | G06F 16/3344 704/9 |
| 2024/0386253 | A1* | 11/2024 | White, Jr. | G06F 40/166 |

OTHER PUBLICATIONS

Anna Rohrbach et al., "Object hallucination in image captioning," Proceedings of the 2018 Conference on Empirical Methods in Natural Language Processing, Association for Computational Linguistics, 2018, p. 4035-4045.
Christopher D. Rosin, "Multi-armed bandits with episode context," Ann Math Artif Intell, Springer, 2011, vol. 61, p. 203-230.
Victor Sanh et al., "Multitask Prompted Training Enables Zero-Shot Task Generalization," ICLR 2022, arXiv:2110.08207v3, 2022, p. 1-216.
Abigail See et al., "Get to The Point: Summarization with Pointer-Generator Networks," Proceedings of the 55th Annual Meeting of the Association for Computational Linguistics, Association for Computational Linguistics, 2017, p. 1073-1083.
David Silver et al., "Mastering the game of Go without human knowledge," Nature, 2017, vol. 550, p. 354-359.
Hongjin Su et al., "One Embedder, Any Task: Instruction-Finetuned Text Embeddings," Findings of the Association for Computational Linguistics: ACL 2023, Association for Computational Linguistics, 2023, p. 1102-1121.
Yi Tay, "A New Open Source Flan 20B with UL2" URL: https://www.yitay.net/blog/flan-ul2-20b Downloaded on Nov. 13, 2024.
James Thorne et al., "FEVER: a large-scale dataset for Fact Extraction and VERification," Proceedings of NAACL-HLT 2018, Association for Computational Linguistics, 2018, p. 809-819.
Pat Verga et al., "Adaptable and Interpretable Neural Memory Over Symbolic Knowledge," Proceedings of the 2021 Conference of the North American Chapter of the Association for Computational Linguistics: Human Language Technologies, Association for Computational Linguistics, 2021, p. 3678-3691.
Alex Wang et al., "Asking and Answering Questions to Evaluate the Factual Consistency of Summaries," Proceedings of the 58th Annual Meeting of the Association for Computational Linguistics, Association for Computational Linguistics, 2020, p. 5008-5020.
Yizhong Wang et al., "Super-NaturalinstructionS; Generalization via Declarative Instructions on 1600+ NLP Tasks," Proceedings of the 2022 Conference on Empirical Methods in Natural Language Processing, Association for Computational Linguistics, 2022, p. 5085-5109.
Thomas Wolf et al., "Transformers: State-of-the-Art Natural Language Processing," Proceedings of the 2020 EMNLP (Systems Demonstrations), Association for Computational Linguistics, 2020, p. 38-45.
Muru Zhang et al., "How Language Model Hallucinations Can Snowball," arXiv:2305.13534v1, 2023.
Ming Zhong et al., "Towards a Unified Multi-Dimensional Evaluator for Text Generation," Proceedings of the 2022 Conference on Empirical Methods in Natural Language Processing, Association for Computational Linguistics, 2022, p. 2023-2038.
Zexuan Zhong et al., "Training Language Models with Memory Augmentation," Proceedings of the 2022 Conference on Empirical Methods in Natural Language Processing, Association for Computational Linguistics, 2022, p. 5657-5673.
Chung-Wen Wu et al., "KNOT-MCTS: An Effective Approach to Addressing Hallucinations in Generative Language Modeling for Question Answering," The 35th Conference on Computational Linguistics and Speech Processing (ROCLING 2023), The Association for Computational Linguistics and Chinese Language Processing, 2023.
Nicolas Garneau et al., "Guided Beam Search to Improve Generalization in Low-Resource Data-to-Text Generation," Proceedings of the 16th International Natural Language Generation Conference, Association for Computational Linguistics, 2023, p. 1-14.
Neeraj Varshney et al., "A Stitch in Time Saves Nine: Detecting and Mitigating Hallucinations of LLMs by Validating Low-Confidence Generation," arXiv:2307.03987v2, 2023.
Ariana Martino et al., "Knowledge Injection to Counter Large Language Model (LLM) Hallucination," The Semantic Web: ESWC 2023 Satellite Events, ACM Digital Library, 2023, p. 182-185.
Baolin Peng et al., "Check Your Facts and Try Again: Improving Large Language Models with External Knowledge and Automated Feedback," arXiv:2302.12813v3, 2023.
Patrick Lewis et al., "Retrieval-Augmented Generation for Knowledge-Intensive NLP Tasks," Advances in Neural Information Processing Systems (NeurIPS 2020), 2020, vol. 33, p. 1-19.
Kurt Shuster et al., "Retrieval Augmentation Reduces Hallucination in Conversation," Findings of the Association for Computational Linguistics: EMNLP 2021, Association for Computational Linguistics, 2021, p. 3784-3803.
Kevin Yang et al., "Fudge: Controlled Text Generation With Future Discriminators," Proceedings of the 2021 Conference of the North American Chapter of the Association for Computational Linguistics: Human Language Technologies, Association for Computational Linguistics, 2021, p. 3511-3535.
Antoine Chaffin et al., "PPL-MCTS: Constrained Textual Generation Through Discriminator-Guided MCTS Decoding," Proceedings of the 2022 Conference of the North American Chapter of the Association for Computational Linguistics: Human Language Technologies, Association for Computational Linguistics, 2022, p. 2953-2967.
Kushal Arora et al., "Director: Generator-Classifiers for Supervised Language Modeling," Proceedings of the 2nd Conference of the Asia-Pacific Chapter of the Association for Computational Linguistics and the 12th International Joint Conference on Natural Language Processing, Association for Computational Linguistics, 2022, vol. 1: Long Papers, p. 512-526.
Satanjeev Banerjee et al., "Meteor: An Automatic Metric for MT Evaluation with Improved Correlation with Human Judgments," Proceedings of the ACL Workshop on Intrinsic and Extrinsic Evaluation Measures for Machine Translation and/or Summarization, Association for Computational Linguistics, 2005, p. 65-72.
Antoine Chaffin et al., "Which Discriminator for Cooperative Text Generation?," SIGIR 2022—45th International ACM SIGIR Conference on Research and Development in Information Retrieval, HAL open science, 2022, p. 2360-2365.
Hyung Won Chung et al., "Scaling Instruction-Finetuned Language Models," arXiv:2210.11416v5, 2022, p. 1-54.
Rémi Coulom, "Efficient Selectivity and Backup Operators in Monte-Carlo Tree Search," CG 2006, LNCS, Springer-Verlag Berlin Heidelberg, 2007, vol. 4630, p. 72-93.
Sumanth Dathathri et al., "Plug and Play Language Models: A Simple Approach to Controlled Text Generation," ICLR 2020, arXiv:1912.02164v4, 2020, p. 1-34.
Tim Dettmers et al., "LLM.int8(): 8-bit Matrix Multiplication for Transformers at Scale," 36th Conference on Neural Information Processing Systems (NeurIPS 2022), arXiv:2208.07339v2, 2022, p. 1-20.
Tim Dettmers et al., "8-BIT Optimizers via Block-Wise Quantization," ICLR 2022, arXiv:2110.02861v2, 2022, p. 1-20.
Emily Dinan et al., "Wizard of Wikipedia: Knowledge-Powered Conversational Agents," arXiv:1811.01241v2, 2019, p. 1-18.

(56) References Cited

OTHER PUBLICATIONS

Thibault Févry et al., "Entities as Experts: Sparse Memory Access with Entity Supervision," Proceedings of the 2020 Conference on Empirical Methods in Natural Language Processing, Association for Computational Linguistics, 2020, p. 4937-4951.
Robert M. French, "Catastrophic Forgetting in Connectionist Networks," Trends in Cognitive Sciences, Elsevier Science, 1999, vol. 3(4), p. 128-135.
Hangfeng He et al., "Rethinking with Retrieval: Faithful Large Language Model Inference," arXiv:2301.00303v1, 2022.
Tianxing He et al., "Analyzing the Forgetting Problem in Pretrain-Finetuning of Open-domain Dialogue Response Models," Proceedings of the 16th Conference of the European Chapter of the Association for Computational Linguistics, Association for Computational Linguistics, 2021, p. 1121-1133.
Edward Hu et al., "LORA: Low-Rank Adaptation of Large Language Models," arXiv:2106.09685v2, 2021, p. 1-26.
Gautier Izacard et al., "Leveraging Passage Retrieval with Generative Models for Open Domain Question Answering," Proceedings of the 16th Conference of the European Chapter of the Association for Computational Linguistics, Association for Computational Linguistics, 2021, p. 874-880.
Ziwei Ji et al., "Survey of Hallucination in Natural Language Generation," ACM Comput. Surv., 2022, vol. 1(1), p. 1-41.
Vladimir Karpukhin et al., "Dense Passage Retrieval for Open-Domain Question Answering," Proceedings of the 2020 Conference on Empirical Methods in Natural Language Processing, Association for Computational Linguistics, 2020, p. 6769-6781.
Nitish Shirish Keskar et al., "CTRL: a Conditional Transformer Language Model for Controllable Generation," arXiv:1909.05858v2, 2019, p. 1-18.
James Kirkpatrick et al., "Overcoming catastrophic forgetting in neural networks," PNAS, 2017, vol. 114(13), p. 3521-3526.
Ben Krause et al., "GeDi: Generative Discriminator Guided Sequence Generation," Findings of the Association for Computational Linguistics: EMNLP 2021, Association for Computational Linguistics, 2021, p. 4929-4952.
Klaus Krippendorff, "Computing Krippendorff's Alpha-Reliability," ScholarlyCommons, 2011, p. 1-10.
Sachin Kumar et al., "Gradient-Based Constrained Sampling from Language Models," Proceedings of the 2022 Conference on Empirical Methods in Natural Language Processing, Association for Computational Linguistics, 2022, p. 2251-2277.
Sylvain Lamprier et al., "Generative Cooperative Networks for Natural Language Generation," Proceedings of the 39th International Conference on Machine Learning, Proceedings of Machine Learning Research, 2022, vol. 162, p. 11891-11905.
Hwanhee Lee et al., "Masked Summarization to Generate Factually Inconsistent Summaries for improved Factual Consistency Checking," Findings of the Association for Computational Linguistics: NAACL 2022, Association for Computational Linguistics, 2022, p. 1019-1030.
Rongzhong Lian et al., "Learning to Select Knowledge for Response Generation in Dialog Systems," Proceedings of the Twenty-Eighth International Joint Conference on Artificial Intelligence (IJCAI—19), International Joint Conferences on Artificial Intelligence Organization, 2019, p. 5081-5087.
Chin-Yew Lin, "Rouge: A Package for Automatic Evaluation of Summaries," Proceedings of Workshop on Text Summarization Branches Out, Post-Conference Workshop of ACL, 2004.
Alisa Liu et al., "Dexperts: Decoding-Time Controlled Text Generation with Experts and Anti-Experts," Proceedings of the 59th Annual Meeting of the Association for Computational Linguistics and the 11th International Joint Conference on Natural Language Processing, Association for Computational Linguistics, 2021, p. 6691-6706.
Nelson F. Liu et al., "Evaluating Verifiability in Generative Search Engines," Findings of the Association for Computational Linguistics: EMNLP 2023, Association for Computational Linguistics, 2023, p. 7001-7025.
Ximing Lu et al., "Neurologic A*esque Decoding: Constrained Text Generation with Lookahead Heuristics," Proceedings of the 2022 Conference of the North American Chapter of the Association for Computational Linguistics: Human Language Technologies, Association for Computational Linguistics, 2022, p. 780-799.
Ximing Lu et al., "Neurologic Decoding: (Un)supervised Neural Text Generation with Predicate Logic Constraints," Proceedings of the 2021 Conference of the North American Chapter of the Association for Computational Linguistics: Human Language Technologies, Association for Computational Linguistics, 2021, p. 4288-4299.
Github, "PEFT: State-of-the-art Parameter-Efficient Fine-Tuning (PEFT) methods" URL: https://github.com/huggingface/peft Downloaded on Nov. 4, 2024.
Joshua Maynez et al., "On Faithfulness and Factuality in Abstractive Summarization," Proceedings of the 58th Annual Meeting of the Association for Computational Linguistics, Association for Computational Linguistics, 2020, p. 1906-1919.
Tao Meng et al., "Controllable Text Generation with Neurally-Decomposed Oracle," 36th Conference on Neural Information Processing Systems (NeurIPS 2022), arXiv:2205.14219v2, 2022, p. 1-21.
Grégoire Mialon et al., "Augmented Language Models: a Survey," arXiv:2302.07842v1, 2023, p. 1-33.
Sewon Min et al., "Factscore: Fine-grained Atomic Evaluation of Factual Precision in Long Form Text Generation," Proceedings of the 2023 Conference on Empirical Methods in Natural Language Processing, Association for Computational Linguistics, 2023, p. 12076-12100.
Long Ouyang et al., "Training language models to follow instructions with human feedback," NIPS'22: Proceedings of the 36th International Conference on Neural Information Processing Systems, ACM Digital Library, 2022, Article No. 2011, p. 27730-27744.
Artidoro Pagnoni et al., "Understanding Factuality in Abstractive Summarization with Frank: A Benchmark for Factuality Metrics," Proceedings of the 2021 Conference of the North American Chapter of the Association for Computational Linguistics: Human Language Technologies, Association for Computational Linguistics, 2021, p. 4812-4829.
Kishore Papineni et al., "BLEU: a Method for Automatic Evaluation of Machine Translation," Proceedings of the 40th Annual Meeting of the Association for Computational Linguistics (ACL), 2002, p. 311-318.
Maja Popović, "CHRF: character n-gram F-score for automatic MT evaluation," Proceedings of the Tenth Workshop on Statistical Machine Translation, Association for Computational Linguistics, 2015, p. 392-395.
Lianhui Qin et al., "Back to the Future: Unsupervised Backprop-based Decoding for Counterfactual and Abductive Commonsense Reasoning," Proceedings of the 2020 Conference on Empirical Methods in Natural Language Processing, Association for Computational Linguistics, 2020, p. 794-805.
Lianhui Qin et al., "Cold Decoding: Energy-based Constrained Text Generation with Langevin Dynamics," 36th Conference on Neural Information Processing Systems (NeurIPS 2022), arXiv:2202.11705v3, 2022, p. 1-18.
Alec Radford et al., "Language Models are Unsupervised Multitask Learners," Paper With Code, 2019.
Hannah Rashkin et al., "Increasing Faithfulness in Knowledge-Grounded Dialogue with Controllable Features," Proceedings of the 59th Annual Meeting of the Association for Computational Linguistics and the 11th International Joint Conference on Natural Language Processing, Association for Computational Linguistics, 2021, p. 704-718.
Vikas Raunak et al., "The Curious Case of Hallucinations in Neural Machine Translation," Proceedings of the 2021 Conference of the North American Chapter of the Association for Computational Linguistics: Human Language Technologies, Association for Computational Linguistics, 2021, p. 1172-1183.

(56) References Cited

OTHER PUBLICATIONS

Stephen Robertson et al., "The Probabilistic Relevance Framework: BM25 and Beyond," Foundations and Trends in Information Retrieval, 2009, vol. 3(4), p. 333-389.

* cited by examiner

KNOWLEDGE-CONSTRAINED TREE SEARCH DECODING WITH TOKEN-LEVEL HALLUCINATION DETECTION

CROSS-REFERENCE TO RELEVANT APPLICATIONS

The present application claims priority from a U.S. provisional patent application Ser. No. 63/588,297 filed Oct. 6, 2023, and the disclosure of which are incorporated by reference in their entirety.

TECHNICAL FIELD

The present invention relates to large language models. More specifically, the present invention presents a method of decoding by heuristic tree search process, coupled with algorithms for detecting and reducing hallucination detection.

BACKGROUND

Large language models (LLMs) are a type of artificial intelligence (AI) designed to understand and generate human-level natural language. They are built using machine learning techniques, particularly deep learning, and are trained on vast amounts of text data.

However, there is a potential for LLMs to generate misinformation, specifically text that is syntactically and semantically plausible but factually incorrect or nonsensical, often referred to as "hallucination".

To mitigate hallucination problems, previous research has attempted to augment the input of the language model with relevant knowledge, employing a reader language model that takes both the context and the reference knowledge as input to generate a response. While this approach has demonstrated potential, it involves fine-tuning the reader language model, which poses significant challenges. First, the ever-increasing size of language models makes training them computationally expensive, which is becoming increasingly prohibitive, not to mention that some API-based LLMs (e.g., OpenAI APIs) are not trainable by end users. Second, many state-of-the-art language models are designed to be multi-task zero-shot models through instruction tuning, aiming to perform well across various tasks.

Another common approach to mitigate hallucination problems is to fine-tune the LLM with the knowledge in its input. However, fine-tuning a language model extensively on a specific task can lead to catastrophic forgetting or catastrophic interference, a phenomenon in which a model abruptly forgets previously leraned information upon learning new information, which in turn greatly compromises its generalizability across different tasks and compromising its overall performance.

In addition, although designing a decoding method for LLMs is a natural way to mitigate hallucinations without fine-tuning, current works in plug-and-play guided decoding, such as weighted decoding (WD), are still inapt to directly be adapted to the knowledge-grounded scenarios due to their inability to identify the necessary knowledge required for generation, which leads to hallucination.

Therefore, there is a need to develop a novel model for hallucination-mitigated LLM decoding without the need of fine-tuning. The present invention addresses this need.

SUMMARY OF THE INVENTION

In one aspect, the present invention provides a computer-implemented model-agnostic natural language generation method.

The computer-implemented model-agnostic natural language generation method comprises providing an information-containing plain text prompt, generating tokens based on the information-containing plain text prompt on an automated basis, re-ordering the importance of each generated token and selecting the token with the highest knowledge groundedness in each scenario through a heuristic search process, determining token-level hallucinations with a specifically trained knowledge classifier by identifying the inflection point of hallucination and replacing the hallucinated tokens with further generated tokens, and generating a plain text response with the tokens with the least hallucination and highest knowledge groundedness.

In one embodiment, the heuristic search process of the computer-implemented model-agnostic natural language generation method is a Monte Carlo tree search, comprising selecting a child node traversing down the tree from the root node until a leaf node is reached, expanding the leaf node until terminal state is reached, evaluating the approximated token-level knowledge groundedness scores of the expansion outcomes, backpropagating recursively the approximated token-level knowledge groundedness scores from the leaf node to the root node, and selecting the child node with highest approximated token-level knowledge groundedness scores for further traversing down the tree to reach the subsequent leaf node.

In another embodiment, the training the knowledge classifier of the computer-implemented model-agnostic natural language generation method comprises providing a training example training example (y, x, k)~D, swapping randomly a knowledge k with another knowledge k' from the knowledge source to form a negative example, sampling a position $1<i<T$, where T is the length of y, truncating the response y to i'th token and obtain $y_i$, and completing the sequence $y_i$ by sampling from $P_{LM}(y|x, y_i, k)$ by including the knowledge text k inside the instruction.

In a further embodiment, in the training process of the knowledge classifier, the tokens are labelled by starting with labelling tokens as positive, the first hallucinated token is labelled as negative, and all tokens after the first hallucinated are predictively labelled as negative.

BRIEF DESCRIPTION OF DRAWINGS

The appended drawings, where like reference numerals refer to identical or functionally similar elements, contain FIGS. of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

DETAILED DESCRIPTION

Figure 1:
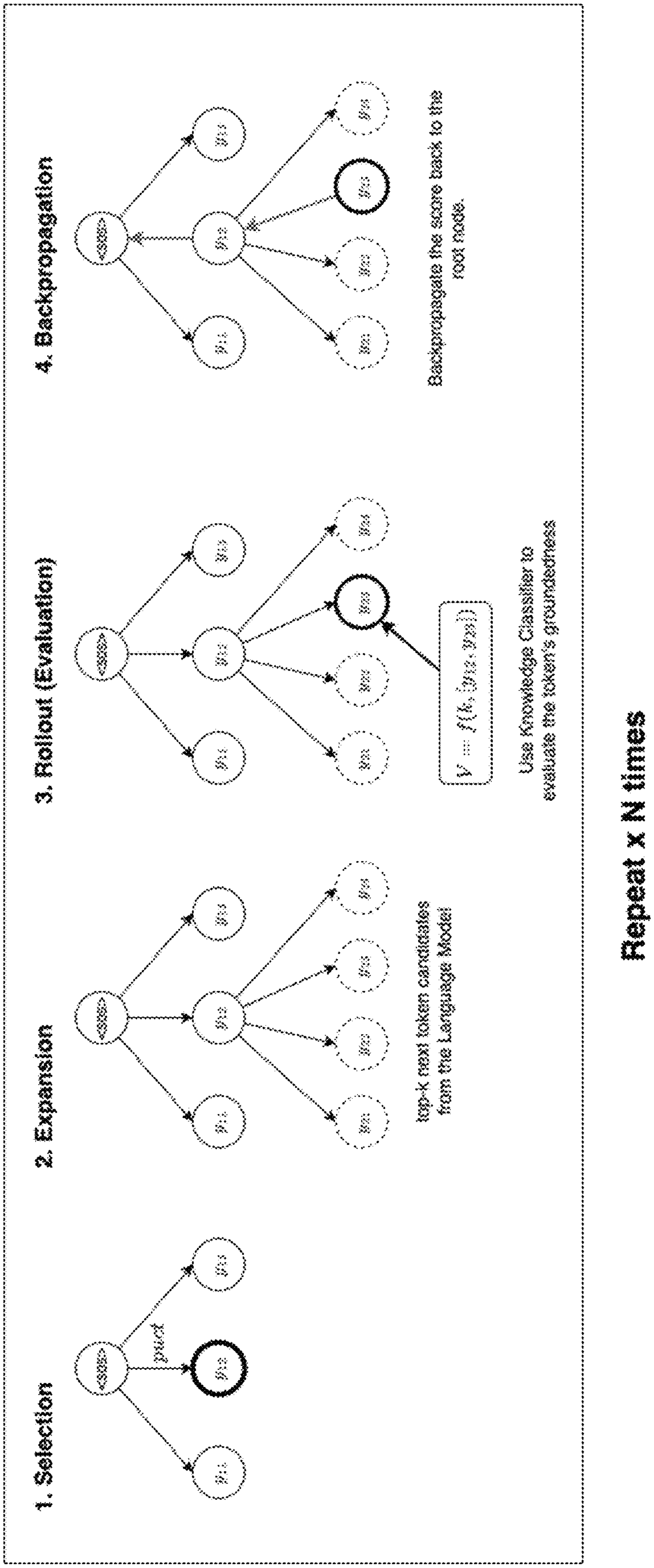
FIG. 1 provides a schematic diagram of the Monte Carlo tree search (MCTS) decoding algorithm, being the first key component of the knowledge-constrained tree search (KCTS) decoding framework.
Figure 2:
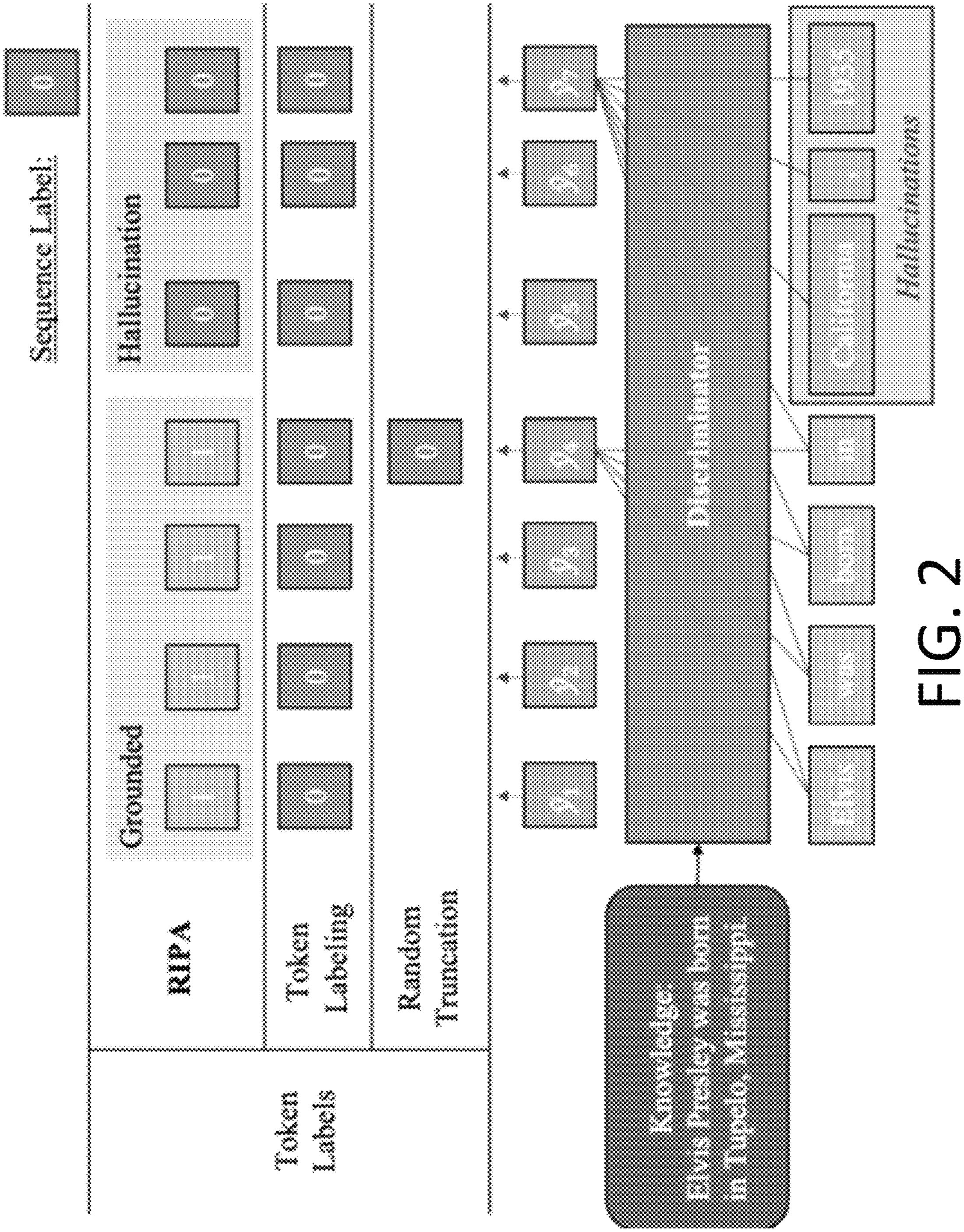
FIG. 2 provides a schematic diagram of another key component of the KCTS decoding framework provided in the present invention, known as the Reward Inflection Point Approximation (RIPA) training of the discriminator.

As used in the disclosure herein, "decoding" refers to the process of text generation from the LLM, when given a prompt or input. Decoding involves selecting words, or tokens, sequentially for the formation of coherent sentences in response to the prompt or input. Common decoding strategies include greedy search, in which the LLM selects the token with the highest probability at each step; beam search, in which multiple candidate sequences known as beams are maintained and expanded in parallel, keeping only the top k beams based on cumulative probability; top-k sampling, in which the top k tokens are sampled by the LLM with the highest probabilities in each step; top-p sampling, in which the LLM samples from the smallest set of tokens which exceed an arbitrary cumulative probability at each step; and temperature sampling, where the probabilities of tokens are adjusted by applying temperature parameter T, under which lower temperature leads to sharper distribution and higher temperature flattens the distribution.

As used in the disclosure herein, "token" refers to the smallest text units for individual processing by LLM. Tokens could be words, subwords (which, under different tokenization methods, each word could be further split into smaller units), characters, or special tokens used for specific purposes in the LLM.

As used in the disclosure herein, "knowledge groundedness" refers to the extent of which the results of the decoding, i.e. the generated text, align with the factual and contextually appropriate information. As such, knowledge groundedness also reflects the degree of hallucination of the outputs from an LLM.

As used in the disclosure herein, "faithfulness" refers to the degree to which the tokens or generated text from the LLM reflects accurately the information or data which is input to the LLM, such that the generated output contextually align with the information received by the LLM.

Hallucination of language models or the generation of contents that are either non-factual or not supported by evidence have been studied and reported in various fields such as machine translation, abstractive summarization or image captioning. Recently developed LLMs such as Bing Chat or perplexity.ai are used as generative search engines despite the responses are not always verifiable. To automatically detect and quantify hallucination in model-generated text, several detection methods and benchmarks have been designed.

Knowledge-grounded generation is mainly driven by retrieving relevant knowledge and training the generator to produce responses augmented on the retrieved knowledge; or by learning and storing entity or fact representations which are provided as input to the generator. While these methods all address the problem of knowledge-grounded generation, full fine-tuning of the generator are required by all of these methods, which may degenerate the zero-shot ability of the base model due to catastrophic forgetting, and thus incurring a significant computational cost, i.e. the ability of the model to perform an unseen task without explicit training on relevant examples, solely basing on the training from which the LLM acquired the knowledge prior.

Guided decoding includes supervised controllable text generation, discriminator-guided decoding and constrained decoding, in which the user controls the sentiment or style of the generated text, or constrain the generation to lexical constraints. Different LMs employ different guided decoding frameworks. For example, Plug-and-play ML (PPLM) introduces a key concept of Bayesian decomposition $P(y|x, c) \propto P(y|x)P(c|y)$, where c is the control attribute. PPLM trains a small discriminator on a frozen LM and performs gradient ascent from the discriminator to maximize $P(c|y)$. FUDGE performs weighted decoding (WD) by direct re-weighing the token probabilities $P(y_t|y_{<t}, x)$ with an auxiliary classifier probability $P(c|y_{<t})$. To perform re-ranking every step, $P(y|x)P(c|y)$ is decomposed into token-level, and a token-level attribute classifier $P(c|y_{<t})$ is used. NADO samples from a similar token-level distribution that is also weighted by $P(c|y_{<t})$, which is defined as an approximation of the sequence-level oracle $P(c|y)$. GeDi and DExperts also take the weighted decoding approach but avoid enumerating the vocabulary for computing $P(c|y_{<t,i})$ by training generative classifiers.

Constrained decoding methods focus on constraint satisfaction, such as lexical constraints or right-hand-side coherence. As constraint satisfaction can be measured after a sequence is fully generated, search-based methods that take the estimate of the future score (reward) in each decoding step have been proposed. Unlike weighted decoding, these methods commit to a token not only based on the current token's score but also on the estimate of future rewards.

In the present invention, a novel method named Knowledge-Constrained Tree Search Decoding (KCTS) is provided, which is a first discriminator-guided constrained decoding approach to knowledge-grounded generation. KCTS applies an auxiliary knowledge classifier on top of a frozen LM to detect hallucinations and uses its knowledge-groundedness score to guide the decoding process.

The KCTS method also employs a Monte-Carlo Tree Search decoding (MCTS) instead of conventional LM decoding methods, which re-orders each token's importance based on the estimated future faithfulness starting from that token with multiple simulations. This leads to a better estimate of a token's value in comparison to the previous arts, which re-orders the tokens based only on current faithfulness score. By incorporating the knowledge classifier and the classifier-guided decoding algorithm, KCTS constrains the generated text, ensuring its faithfulness to the reference knowledge.

In addition, a novel token-level hallucination detection method, RIPA (Reward Inflection Point Approximation), is trained to predict the starting point of the hallucinating token, enabling effective adaptation of the knowledge classifier defined on the sequence level to the token level. RIPA knowledge classifier solves two problems from previous arts: it alleviates expensive retraining of LM weights by keeping the LM frozen and training adapter weights only, and it precisely determines if the text being generated contains hallucination or not. This provides a better signal to the MCTS decoding algorithm, leading to more faithful text generation.

Further, the KCTS method of the present invention is model-agnostic, enabling post-hoc application to models which have been previously trained. Also, the KCTS model does not involve fine-tuning of the LLM, which incurs a heavy computational cost.

EXAMPLES

Example 1—Problem Statement

The instruction-tuned LMs' factual generation ability is to be improved under a constrained decoding setting. The problem can be formulated as $$y \sim P_{LM}(y|x, k, \alpha_k), \quad (1)$$

where y is generated text, x is input text with the task description, k is the piece of knowledge that y must be constrained to, and $a_k$ is the attribute denoting the groundedness of y to k.

Let $f(y, k)=P(\alpha_k=1|y, k)$ be a function that defines the faithfulness of the generation y to k. Following the Bayesian decomposition, the Bayes rule is applied to equation (1) above to obtain equation (2) below:

$$P_{LM}(y|x, k, \alpha_k) \propto P_{LM}(y|x) f(y, k). \tag{2}$$

From an optimization perspective, obtaining a generation that is best grounded in the knowledge while being faithful to the task instruction can be written as the equation below:

$$y^* = \arg\max P_{LM}(y \mid x) f(y, k). \tag{3}$$

Then, given the auto-regressive nature of language models, this equation can be decomposed into a token-level as found in FUDGE:

$$y_t^* = \arg\max_{y_t} P_{LM}(y_t \mid y_{<t}, x) f(y_{\leq t}, k). \tag{4}$$

1.1 Token-Level Faithfulness.

Knowledge faithfulness f (or hallucination in the opposite perspective) is well-defined at the sequence level, which can be modeled as an entailment or fact verification problem. However, to guide the generation at each step, we need to define $f(y_{<t}, k)$ for partially generated $y_{<t}$. Following NADO (Meng et al., 2022), we define $f(y_{<t}, k)$ as the approximation of future faithfulness, as denoted in the following equation:

$$f(y_{<t}, k) \approx f(P(y|y_{<t}, x), k). \tag{5}$$

Example 2—The KCTS Method 2.1 Monte-Carlo Tree Search Decoding

While weighted decoding (WD) re-weights the token distribution with the knowledge-groundedness score at every step, it selects the most grounded token in a greedy manner, which may lead to a suboptimal solution. This is especially problematic given that the groundedness is only well-defined after the sequence is fully generated, and the guidance signal from the classifier at each step is an approximation. To this end, we propose to use the Monte-Carlo Tree Search Algorithm (MCTS), which can provide a better estimate of the future knowledge groundedness through multiple simulations, as has been proven effective in other scenarios such as sentiment polarity control.

MCTS consists of four main steps: Selection, Expansion, Rollout, and Backpropagation.

Selection: Starting from the root (the currently generated sequence), we traverse the tree down until we reach a leaf node, selecting the children using the PUCT algorithm:

$$puct(i) = \frac{V(s_i)}{n_i} + c_{puct} P(y_{s_i} \mid x, y_{<t}), \frac{\sqrt{N_i}}{1 + n_i},$$

where $V(s_i)$ is the estimated value of node $s_i$, $n_i$ is the visit count of the node $s_i$ (i.e., number of simulations after the node), and $N_i$ is the number of visit count of the parent of $s_i$. $c_{puct}$ is a hyperparameter that controls the trade-off between exploration and exploitation, with higher $c_{puct}$ encouraging exploration. P denotes the language model probabilities.

Expansion: If the selected leaf node is not EOS (terminal state), the node is expanded in depth with k children by decoding for one step using the LM and selecting top-k tokens as the children.

Rollout (Evaluation): from the selected leaf node s, generate until EOS using the language model, then evaluate the faithfulness of the generated sequence, f(y, k), using the knowledge classifier denoted as f. Let this be the value of s, V(s)=f(y, k). However, such a full rollout can be costly and result in high variance. Hence, we used the approximated token-level groundedness score instead: $V(s) \leftarrow f(y_{<t's}, k)$, where $y_{<t's}$ refers to currently generated sequence $y_{<t}$ appended by a token s.

Backpropagation: Then, this score is backpropagated recursively from the node previously evaluated back to the root. Following PPL-MCTS, mean aggregation of all simulations played after this node is used. This leads to $$V(\rho(s_i)) \leftarrow \frac{\text{N\_i} \cdot V(\rho(s_i)) + f(y_{<t, s_i}, k)}{n_i},$$

for all $s_i$ on the path from the leaf node s to the root, where $\rho(s_i)$ is parent of $s_i$. These values will be used in the PUCT algorithm to select the nodes in Step 1 in the next simulation.

Steps 1 to 4 are repeated for pre-defined amount of simulations. For the present invention, the number of simulations is set to 50 for strong and reliable performance in terms of knowledge-grounded generation.

2.2 Token-Level Hallucination Detection f is first modelled as a fact verification problem, and a binary classifier $f(y, k)=P_f(\alpha_k=1|y, k)$ is trained on the sequence level. To adapt f to token-level faithfulness $f(y_{<t})$, previous methods trained a classifier with random input sequence truncation or token-level labeling. The random truncation approach can be sample inefficient as only a part of the input is used during training, and it may add noise to the training since the input sequence may no longer contain hallucinated content after truncation while still receiving a negative label. Although the token-level labeling approach can be more sample efficient, it may induce even more noise during training and hinder convergence.

To alleviate these shortcomings, a novel approach called Reward Inflection-Point Approximation (RIPA) is developed to approximate future f for unfinished token sequences by explicitly providing a token-level label for groundedness. A schematic diagram of the comparison of RIPA and previous approaches can be found in FIG. 1. Inspired by the "Hallucination Snowballing" effect, where the language model's initial hallucination leads to further unsupported claims down the line, identifying such an inflection point for groundedness is a more effective approximation of the future score. Hence, RIPA trains the classifier to identify the starting point, or the inflection point, of the reward (groundedness) with token-level labels that start with 1 (positive) and become 0 (negative) after the first hallucinated token.

RIPA does not associate benign tokens with hallucination labels, which may lead to more stable training. Additionally, it is trained to predict 0 for all tokens after hallucination is detected, which will further discount future exploration under that node in MCTS, discouraging the selection of that token. Together, RIPA and MCTS (i.e. KCTS) provide a better estimate of equations (4) and (5).

Training RIPA requires fine-grained token-level annotation of hallucination, which is difficult to acquire through human annotation. Alternatively, two simple approaches to generating synthetic data are listed below.

Knowledge Shuffle: Given a training example (y, x, k)~D, randomly swap k with another knowledge k' from the knowledge source to form a negative example. Then, although the relevance between y and x remains unchanged, the groundedness of y on k becomes negative, as y is no longer based on k. All tokens in y are labeled 0.

Partial Hallucination: Similar to above, given a training example (y, x, k)~D, first randomly swap k with another knowledge k'. Then, randomly sample a position 1<i<T, where T is the length of y, and truncate the response y to i'th token and obtain $y_i$. An LM is then asked to complete the sequence $y_i$ by sampling from $P_{LM}(y|x, y_i, k)$ in a zero-shot manner, by including the knowledge text k inside the instruction. Notice that the goal here is to utilize the hallucination of LMs: hence, we sampled the completion with a temperature greater than 1. In this approach, only the completion tokens ($y_{>i}$) are labeled as 0.

A balanced mixture of the two to obtain the training set is used; however, for tasks in which x and k are indistinguishable (e.g. summarization), the problem becomes P(y|k). Therefore, only the partial hallucination approach was employed. Detailed hyperparameters used in each task are presented further below.

Example 3—Experimental Setup

3.1 Datasets

To show the strength of the guided decoding method in knowledge-grounded generation, two well-studied tasks are selected: knowledge-grounded dialogue and abstractive summarization. In both tasks, the language model is given a piece of reference knowledge in the input and asked to generate a response using that knowledge.

Knowledge Grounded Dialogue: Knowledge-grounded dialogue (KGD) can be formulated as modeling $P_{LM}(y|x, k)$, where y is the generated response, xxx is dialog history, and k is the relevant knowledge. Gold knowledge is experimented with, as the focus of this study was to show the potential of constrained decoding in knowledge grounding. The Wizard of Wikipedia (WoW) dataset's unseen topic portion of the test set is used as the benchmark dataset for this task.

Summarization: Abstractive summarization can be naturally considered a knowledge-grounded generation task, as the generated summary should only contain the information from the reference document. Improving factual faithfulness in abstractive summarization is a challenging task. The CNN/DM dataset is used as the benchmark dataset for investigation.

3.2 Evaluation Metrics

Various evaluation metrics applied for knowledge grounding and natural language generation are used. The metrics are categorized into three categories: token-based, knowledge-based, and multi-faceted. For token-based automatic metrics, BLEU-4, Rouge-L, ChrF and METEOR 5 are used. For knowledge-based metrics, Knowledge-F1 (KF1) is first used, which measures the unigram overlap between the generated and knowledge tokens, and K-Copy, as defined in equation (8):

$$1 - \frac{LD(y, k)}{\max(|y|, |k|)}, \tag{8}$$

where LD stands for Levenshtein Distance between the generated response and reference knowledge string. This metric captures the amount of verbatim copies of the knowledge in a generation. The purpose of this metric is to monitor if the model simply copies the knowledge as a response, which defeats the purpose of using a generative LM. Hence, an excessively high copy rate (e.g., ≥70%) may indicate a reduced utility of the response.

Finally, UniEval, a multifaceted, model-based evaluator trained using Boolean QA format, is also utilized. For the dialog task, Naturalness, Coherence (with dialogue context), and Groundedness (to the knowledge), are utilized; and for summarization, Coherence (within the summary), Consistency (with the article), Fluency, and Relevance (to the gold answer) are taken as fine-grained evaluation dimensions. For summarization, the MFMA (Lee et al., 2022) pre-trained metric is also employed, which showed SOTA-level correlation with human labels on the CNN/DM (data split of FRANK and QAGS benchmark).

3.3 Baselines

Popular API-based LLMs and publicly available instruction-tuned language models of various sizes are used as the initial baseline. The LLMs provided through the OpenAI API are investigated; namely, ChatGPT (gpt-3.5-turbo-0301) and GPT 3.5 (text-davinci-003). For instruction-tuned models, two different sizes (XL & XXL) of the Flan-T5 (FT5) model family, and T0++ are investigated. Note that they are not directly compared with the method due to the significant differences in terms of the model size and training cost.

Note that while FT5 and T0++ models have been fine-tuned on some dialogue data, knowledge-grounded dialogue is still an unseen task for these models. Hence, zero-shot results are first gathered from various instruction-tuned models and experimented with guided decoding. On the other hand, the CNN/DM summarization task is included in the T0 dataset mixture and the Natural Instructions dataset, which was part of the Flan fine-tuning. Therefore, performing Knowledge-Constrained Decoding (KCD) on the CNN/DM test set can be considered guiding an already fine-tuned model to improve the factuality dimension further.

Then, weighted decoding (WD) is applied and constrained decoding baselines, namely FUDGE, NADO, and MCTS, on the KCD setting directly, which serves as the strong baseline directly comparable to the present method.

3.4 Implementation Details

To train the classifiers, lightweight adapters are applied through LoRA only to the decoder layers of the language model and added a single linear layer on top of the last hidden states. This only adds 0.21% of additional training weights that can be disabled or enabled at test time, which does not hurt the rich multi-task ability of the base instruction-following model. More details about model training are available further below.

Example 4—Main Evaluation

4.1 Results Analysis

The performance of zero-shot LLMs and various instruction-finetuned models is reported in the upper half of Table 1, and the performance of directly comparable decoding-based baselines and the methods of the present invention in the lower half. The performance of a Supervised-FineTuned (SFT) version of FT5-XL for the KGD task is also studied. Note that the performance in the upper half (LLM and SFT) is only used to provide an overview of how powerful each language model is when tested on WoW and is not directly compared to the present methods. The instructions used for each model are listed further below.

TABLE 1

Results on WoW Test set (unseen topics).

| Type | Model | K-Overlap | | Token Overlap | | | | | UniEval | | | |
|---|---|---|---|---|---|---|---|---|---|---|---|---|
| | | KF1 | K-Copy | F1 | BLEU | RougeL | ChrF | METEOR | N | C | G | f |
| LLM | ChatGPT | 49.41 | 39.71 | 30.32 | 6.91 | 26.24 | 34.95 | 31.67 | 57.62 | 96.41 | 96.15 | 95.82 |
| | GPT-3.5 | 25.91 | 28.22 | 22.33 | 3.01 | 18.70 | 27.86 | 23.06 | 42.77 | 98.07 | 92.42 | 92.63 |
| SFT | FT5-XL | 39.85 | 37.79 | 28.08 | 9.41 | 25.11 | 31.17 | 25.40 | 76.44 | 92.36 | 95.16 | 97.90 |
| Zero-Shot | FT5-XL | 34.50 | 37.07 | 21.18 | 6.81 | 19.64 | 24.88 | 18.53 | 71.69 | 82.21 | 75.70 | 88.75 |
| | FT5-XXL | 28.20 | 32.33 | 19.11 | 5.53 | 17.55 | 24.15 | 17.16 | 72.37 | 84.24 | 75.51 | 85.89 |
| | T0++ | 26.94 | 28.80 | 17.57 | 4.13 | 16.14 | 19.84 | 13.37 | 52.79 | 85.26 | 70.14 | 88.61 |
| Decoding Baselines | FUDGE | 55.30 | 54.04 | 29.43 | 11.72 | 27.35 | 31.50 | 26.00 | 73.68 | 88.20 | 83.53 | 94.54 |
| | NADO | 50.20 | 50.10 | 27.86 | 10.57 | 26.01 | 29.84 | 24.51 | 74.14 | 88.35 | 81.10 | 92.76 |
| | MCTS | 55.54 | 54.21 | 29.56 | 11.69 | 27.48 | 31.60 | 26.08 | **74.54** | 88.16 | 83.90 | 95.07 |
| Ours | KWD | **58.19** | 56.58 | **30.71** | **12.74** | **28.27** | 33.40 | 28.10 | 70.27 | 90.51 | 87.86 | 97.54 |
| | KCTS | 56.06 | 51.90 | 30.54 | 11.42 | 27.43 | **35.22** | **28.92** | 62.32 | **92.78** | **91.78** | **98.30** |

SFT stands for supervised fine-tuning, and FT5 is shorthand for Flan-T5. Under the UniEval metrics, each letter stands for the following: N—Naturalness, C—Coherence, G—Groundedness. For all metrics, a larger number is preferred, except for K-Copy. Note that the performance of LLM in the upper half is for reference only. For each column, boldface denotes the best score out of the KCD methods under the FT5-XL backbone, and underline indicates the second best.

From the results in the upper half of Table 1, ChatGPT shows a strong ability to generate responses with high overlap with the knowledge. On the other hand, FT5-XL, while being the smallest in size (3B) out of all the models studied, showed the best performance in generating responses that are the most grounded to the reference knowledge, as indicated by the KF1 and Groundedness columns of Table 1. Therefore, FT5-XL is selected as the base model in further studies for guided decoding.

The comparison of baseline decoding methods and KCTS of the present invention can also be found in the lower half of Table 1. The Knowledge-Weighted Decoding (KWD), a RIPA-guided WD variant, is also experimented for ablation purposes. The penultimate group contains the results of baseline guided decoding methods, used with each of their own proposed approximation of token-level classifiers. FUDGE and MCTS both use random truncation approximation, and NADO uses a token-level labeling approach. All decoding methods showed improvement over the nucleus sampling baseline regarding groundedness to the knowledge, indicated by a higher KF1 score and the Groundedness column of UniEval. The results also clearly show that the RIPA provides a better token-level guidance signal for KCD, as both KWD and KCTS show improvement in dimensions except naturalness. KCTS also resulted in the highest f activation, confirming the hypothesis that MCTS, which also estimates future rewards for token selection through simulations, can produce a higher reward.

To show that KCTS guides the future generation trajectory towards a more grounded response in the end, the token generation is constrained for initial T tokens, then letting the original language model complete the sentence with nucleus sampling. The results in Table 2 indicate that the initially grounded tokens provide a good context to the LM that leads to a more grounded response generation, following the intuition of using MCTS with RIPA to fulfill the definition of future faithfulness $f(y_{<t}, k) \approx f(P(y|y_{<t}), k)$. Moreover, this provides a performance/speed trade-off parameter that users can adjust.

TABLE 2

Ablation study on the number of initial tokens to be constrained in the knowledge with KCTS.

| T | K-Overlap | | Token Overlap | | UniEval | | |
|---|---|---|---|---|---|---|---|
| | KF1 | K-Copy | BLEU | RougeL | C | G | f |
| 5 | 48.78 | 48.22 | 10.17 | 25.39 | 90.58 | 85.87 | 90.58 |
| 10 | 48.24 | 48.05 | 9.98 | 25.87 | 90.22 | 86.41 | 85.43 |
| 16 | 51.49 | 48.67 | 11.07 | 26.44 | 92.83 | 89.99 | 92.76 |
| 32 | 56.06 | 51.90 | 11.42 | 27.43 | 92.78 | 91.78 | 98.30 |

A human evaluation of the generated responses is also conducted to assess their quality. 100 examples are randomly sampled and three different evaluators are asked to measure their fluency, relevance to the dialogue context, groundedness to reference knowledge, and if the response is an unnatural copy of the knowledge. The human evaluation results in Table 3 further confirm the strength of KCTS, which received better scores in all dimensions than the baselines. Furthermore, KCTS resulted in higher relevance and groundedness while copying less knowledge than FUDGE, which suggests that KCTS responses have higher perceived utility. The results in the Non-Copy group also show that KCTS outperforms baselines even excluding the knowledge-copied responses.

TABLE 3

Human evaluation in 3-point Likert scale on WoW Test set.

| | Model | Fl. | Relv. | Gr. | K-Copy |
|---|---|---|---|---|---|
| Overall | ChatGPT | 3.00 | 2.73 | 2.62 | 0.04 |
| | FT5-XL | 2.64 | 2.30 | 1.95 | **0.12** |
| | FUDGE | 2.82 | 2.35 | 2.19 | 0.21 |
| | KCTS | **2.92** | **2.55** | **2.37** | 0.17 |
| Non-Copy | ChatGPT | 3.00 | 2.75 | 2.60 | — |
| | FT5-XL | 2.61 | 2.31 | 1.81 | — |
| | FUDGE | 2.78 | 2.40 | 1.97 | — |
| | KCTS | **2.91** | **2.61** | **2.24** | — |

Fl., Relv., and Gr. stands for Fluency, Relevance, and Groundedness, respectively. The interrater agreement by Krippendorff alpha was 0.57, 0.46, 0.77, 0.31. Non-Copy means average scores of examples that annotators agreed the generation does not copy the knowledge.

4.2 Summarization Results

The same models as in 4.1 are used. From the results found in Table 4, it can be observed that ChatGPT again outperforms other models in most dimensions, except for BLEU and Rouge metrics. On the other hand, the instruction-tuned models show a different trend than with the KGD setting; the T0++ model outperforms FT5 models, presumably because Flan fine-tuning introduces a vast amount of additional tasks than the T0 fine-tuning dataset mixture, leading to deteriorated performance in some tasks.

TABLE 4

Results on CNN/DM Test set.

| | | K-Overlap | | Token Overlap | | | | | UniEval | | | | MFMA |
|---|---|---|---|---|---|---|---|---|---|---|---|---|---|
| Type | Model | KF1 | K-Copy | F1 | BLEU | RougeL | ChrF | METEOR | Coh. | Cons. | fluency | Relv. | score |
| LLM | ChatGPT | 29.43 | 17.92 | 40.45 | 11.75 | 27.85 | 42.96 | 37.66 | 93.85 | 91.67 | 87.15 | 87.11 | 80.62 |
| | GPT-3.5 | 27.54 | 16.94 | 38.96 | 10.78 | 26.63 | 41.17 | 35.38 | 92.56 | 90.33 | 85.73 | 85.78 | 78.74 |
| SFT | FT5-XL | 17.04 | 10.18 | 32.21 | 8.74 | 24.02 | 30.27 | 24.47 | 84.82 | 86.02 | 89.90 | 81.28 | 64.55 |
| | FT5-XXL | 17.45 | 10.42 | 31.55 | 8.43 | 23.38 | 29.95 | 23.91 | 87.17 | 88.58 | 90.00 | 82.28 | 68.37 |
| | T0++ | 22.79 | 13.65 | 38.82 | 13.64 | 28.06 | 38.53 | 33.68 | 86.57 | 87.47 | 89.03 | 81.09 | 69.38 |
| Decoding | FUDGE | 18.68 | 10.70 | 33.51 | 9.32 | 24.83 | 31.06 | 24.93 | 90.52 | 90.61 | 83.37 | 82.00 | 71.35 |
| Baseline | NADO | 20.35 | 11.72 | 35.10 | 10.93 | 26.22 | 33.50 | 27.34 | 92.26 | 93.72 | 88.41 | 84.49 | 72.01 |
| | MCTS | 17.86 | 10.04 | 34.59 | 9.00 | 25.85 | 30.90 | 25.12 | 94.30 | 94.28 | 86.51 | 85.90 | 71.28 |
| Ours | KWD | 20.39 | 11.63 | 36.24 | 12.30 | 27.20 | 34.25 | 28.46 | **96.24** | **96.64** | **91.60** | **88.48** | 85.11 |
| | KCTS | **22.97** | 13.29 | **38.27** | **14.21** | **28.10** | **37.18** | **31.37** | 95.85 | 96.03 | 90.24 | 87.16 | **85.36** |

The guided decoding was conducted with FT5-XL model as the base model. Coh., Cons., and Relv. stand for coherence, consistency, and relevance, respectively. As the performance of LMs is for reference, best scores on the last two groups are highlighted with boldface and second-best with underline.

For efficiency, the smallest Flan-T5-XL model is used throughout guided decoding experiments with the summarization task. KCTS again showed superior performance over the baseline methods, with significant improvement in token overlap and MFMA. RIPA-guided decoding also outperformed all baseline methods in UniEval, with KWD showing slightly better performance than KCTS.

50 samples are randomly selected for human evaluation, with the same three human evaluators from the KGD task as above. The evaluators were asked to evaluate the summaries in three dimensions: fluency, groundedness, and completeness. Groundedness is analogous to the precision of knowledge, while completeness is similar to recall. It can be observed from Table 5 that the evaluators preferred KCD over the baselines in all dimensions, including groundedness and completeness.

TABLE 5

Human evaluation on CNN/DM.

| Model | Fluency | Grounded | Complete |
|---|---|---|---|
| ChatGPT | 3.00 | 2.93 | 2.88 |
| FT5-XL | 2.81 | 2.60 | 2.13 |
| FUDGE | 2.89 | 2.90 | 2.31 |
| KCTS | **2.95** | **2.97** | **2.40** |

This follows a 3-point Likert scale with agreement alpha of 0.35, 0.44 and 0.19.

Example 5—Instruction Templates

The instructions used for different models and tasks are listed in Table 6. For ChatGPT with the KGD task, we used the chat completion API, where each dialogue turn is separated and formatted as a user/assistant message, and the instruction was given as the system message at the end.

TABLE 6

Instruction templates for different models for different tasks.

| Model | Task | Instruction |
|---|---|---|
| FT5.T0.GPT3.5 | Summarization | ### Document:<br>ARTICLE<br>Given the article, generate<br>a faithful summary. |
| | KGD | History:<br>DIALOG<br>Knowledge:<br>KNOWLEDGE<br>Given the dialog history and a<br>relevant knowledge, generate a<br>knowledgeable, useful, and<br>helpful response. |
| ChatGPT | Summarization | Summarize the following text:<br>ARTICLE |
| | KGD | {content: turn 1, role: user}<br>{content: turn 2, role: assistant}<br>. . .<br>{content: Use the following<br>knowledge, but not directly copy,<br>to generate a concise response:<br>"KNOWLEDGE",<br>role: system} |

Example 6—Application to LLMs

As a preliminary study, knowledge-constrained decoding is applied on LLMs, specifically GPT-3.5 (text-davinci-003). One limitation of the OpenAI API is that it does not return the token probability distribution over the whole vocabulary; at most, the top-5 log probabilities are returned. This significantly limits the search space for all WD methods, which may reduce the ability to guide the generation toward the objective. Hence, we propose a new method called pre-WD, where we use a proxy model to propose top-k tokens first, re-rank the tokens with RIPA, then include it in the API request in the logit bias field, which is added to the logit of the LLM before sampling. This can be denoted as:

$$Z_i = Z_i^{LLM} + \alpha\left[\tilde{Z}_i + \log f(y_{<t,i}, k)\right] \quad (9)$$

where $Z_i$ is the logit of a token i, $Z^{LLM}$ is the logit of the base LLM, and $\tilde{Z}$ is the logit of the smaller proxy model. α is another hyper-parameter that controls the strength of logit bias. Since GPT2 shares its vocabulary with the GPT3 family, $\tilde{Z}$ was computed with GPT2-XL.

100 examples are randomly sampled from the WoW test set for this experiment. The results in Table 7 show that applying post-guidance does not improve much, as the search space is limited: without sufficient width, the generation is bound to what the base model believes. On the other hand, although the overlap between tokens proposed by the proxy model and the actual token distribution is unknown, the empirical results suggest that this method can successfully add bias toward tokens that are grounded on reference knowledge. Finally, using both pre-guidance and regular post-reweighting together can result in the most faithful generation.

All implementations were based on the huggingface transformers and peft libraries. The evaluate library is utilized for metric implementations. All the pretrained model weights were downloaded from the huggingface hub. Human evaluation is performed by three postgraduate NLP researchers with at least one year of experience in the field.

Example 8—Generated Examples

Some example outputs are included from each method for the case study for KGD in Table 8 and summarization in Table 9. Example 1 and 2 of Table 8 show the strength of our approach. In Example 1 of Table 8, while the FT5-XL fails to address the knowledge entirely and FUDGE outputs "sweater" which is not mentioned, KCTS uses the knowledge in a natural way to generate the response. ChatGPT also generates a well-grounded response. In Example 2 of Table 8, FT5-XL is not very informative, FUDGE makes an unsupported claim about goldendoodle's popularity, while KCTS generates the most knowledgeable response. On the other hand, Example 3 of Table 8 shows the failure case for all models. While the provided knowledge is about "fish protein powders" being sanitary, ChatGPT mentions high protein content and other models mention taste.

TABLE 7

GPT3.5 + RIPA (WD) on 100 random examples from WoW test set (unseen topics).

| | K-Overlap | | Token Overlap | | | | | UniEval | | |
|---|---|---|---|---|---|---|---|---|---|---|
| Decoding | KF1 | K-Copy | F1 | BLEU | RougeL | ChrF | METEOR | N | C | G |
| GPT-3.5 | 25.75 | 28.40 | 23.71 | 3.91 | **20.20** | 28.53 | **24.46** | 40.42 | 98.70 | 94.19 |
| +RIPA (WD) | 26.94 | 29.53 | 23.80 | 3.41 | 19.78 | 28.58 | 24.32 | **45.62** | 97.80 | 94.12 |
| +RIPA (Pre-WD) | 27.44 | 29.15 | 23.86 | 3.91 | 19.93 | 28.02 | 23.64 | 39.24 | **98.90** | 94.43 |
| +RIPA (Pre + Post WD) | **27.92** | **30.51** | **24.00** | **4.00** | 19.96 | **28.83** | 23.97 | 41.43 | 98.72 | **95.18** |

Example 7—Implementation Details

The response length was set to 64 tokens for summarization and 32 for KGD. For nucleus sampling, top-p was 0.95 with temperature=1, which also applies to OpenAI models. For all decoding methods studied, top-k filtering is applied with k=50. In addition, in NADO, the constraining factor α was set to 0.25, and in MCTS, the constant $c_{puct}$=3. We also applied a repetition of 1.2 for MCTS following the original implementation.

The synthetic data generated has the following statistics: for WoW, 8,832 partial hallucination examples were generated using FT5-XL in a zero-shot manner, with temperature T=1.4 to encourage hallucination. 10,000 knowledge shuffle examples are also sampled, along with 20,000 original examples, leading to a balanced mixture of 20 k positive examples and 18.8 k negative examples. For CNN/DM, 12,811 partial hallucination negative examples were generated using the same procedure. The final dataset included 13,180 positive examples as well. A random 9:1 split is then applied to obtain the training and validation sets.

All experiments were conducted with NVIDIA GPUs with CUDA 11.7 and CuDNN 7.5 or higher enabled. Either RTX A6000 48 GB, RTX 3090 Ti 24 GB, or RTX 3090 24 GB GPUs is used. All classifier training was performed with an effective batch size of 64 for KGD and 32 for summarization for 2000 steps. For efficiency, the models are loaded in 8-bit quantization with bitsandbytes, both during training and inference.

Table 9 includes two success cases for KCD. The ChatGPT response tends to be more detailed, which may contribute to having higher completeness in human evaluation, but it can be not sufficiently concise to serve as a good summary. FT5-XL may generate seemingly unrelated comments, and FUDGE can degenerate in fluency during token re-ranking. KCTS generates the most concise and faithful summary that captures the core of the article.

TABLE 8

Example generations selected from WoW test set.

| | | |
|---|---|---|
| Example 1 | Context | hey, do you like cardigans? |
| | Knowledge | a more modern version of the garment has no buttons and hangs open by design. |
| | ChatGPT | Yes, I do like cardigans. I particularly like the more modern version that has no buttons and hangs open by design. |
| | FT5-XL | I love cardigans. |
| | FUDGE | A cardigan is a sweater with buttons. |
| | RIPA (MCTS) | I like cardigans, but i don't like the buttoned version. |
| Example 2 | Context | i love dogs! my favorite breed is the goldendoodle! they're a crossbreed between and golden retriever and a poodle. i have seen one before and they are so cute. they are so fluffy and cute right?! the original purpose of the cross was actually to develop guide dogs suitable for those with allergies to dogs! has it been successful for that purpose? |

TABLE 8-continued

| Example generations selected from WoW test set. | | |
|---|---|---|
| | Knowledge | their coats do not shed, which reduces dander. |
| | ChatGPT | Yes, the goldendoodle's coat doesn't shed much, making them great for people who suffer from allergies. The breed's hypoallergenic coat means . . . |
| | FT5-XL | That's true! |
| | FUDGE | Yes, they are very popular with people with allergies. |
| | RIPA (MCTS) | Yes, they are a great breed for people with allergies because their coats do not shed which reduces the amount of dander that can be . . . |
| Example 3 | Context | i drink protein powder with nothing but water. really? have you ever tried fish protein powder? sounds gross, but its made for humans to drink. does it smells and taste good. maybe i could give it a trial. i am trying to gain muscles here. |
| | Knowledge | fish protein powders have various sanitary processing. purity and functional characteristics which establish them as human food ingredients. |
| | ChatGPT | Fish protein powder is actually a popular supplement among bodybuilders due to its high protein content and amino acid profile. It is made through a sanitary processing method to ensure . . . |
| | FT5-XL | yes it smells very good and tastes very good. |
| | FUDGE | yes, it is a good source of protein, |
| | RIPA (MCTS) | yes, it is a good source of protein and it has a good taste. |

TABLE 9

| Example generations selected from CNN/DM test set. | | |
|---|---|---|
| Example 1 | Article | (CNN)Their relationship led to jail time for her, but Mary Kay Letourneau Fualaau wants the world to know that she and her husband, Vili Fualaau, are still happily together. She was a married 34-year-old teacher and mother of four in Seattle in 1996 when she began an affair with Fualaau, her 13-year-old student. Letourneau gave birth to her young lover's child and went on to serve more than seven years in prison on charges related to their sexual relationship. On Friday, ABC's "20/20" will air an exclusive interview with the couple, who will celebrate their 10th wedding anniversary on May 20. The pair wed soon after she was released from prison in 2005 and are now the parents of two teen girls. According to ABC, during the interview with Barbara Walters, "Mary Kay tells Walters what makes their marriage work in spite of their huge difference in their age." "She also discusses her surprising plans to teach again, as well as her intentions to have her status as a registered sex offender lifted," a posting on the network's site says. "Vili Fualaau, meanwhile, discusses his bouts with alcoholism, depression and why he believes the system failed him while he was still a minor." Letourneau Fualaau is now 53, and her husband is 31. |
| | ChatGPT | Mary Kay Letourneau Fualaau and her husband, Vili Fualaau, are still happily together and are celebrating their 10th wedding anniversary on May 20. Letourneau Fualaau served over seven years in jail for having an affair with Fualaau, her 13-year-old student. |
| | FTS-XL | It's been more than 10 years, and no, that's not a big difference in age. |
| | FUDGE | A married teacher and mother of four in Seattle in 1996 began an affair with her student, Vili Fualaau, who was a teen then a teen-ager. |
| | RIPA (MCTS) | Mary Kay Letourneau Fualaau, who gave birth to her young lover's child and went on to serve more than seven years in prison, will tell Barbara Walters how she and her husband, Vili Fualaau, are still happily together. |
| Example 2 | Article | Tim Sherwood's penchant for a gilet has put the Aston Villa boss' sense of fashion in the spotlight and it isn't hard to imagine what he thought about Carles N'Zogbia's choice of attire on Tuesday. The Villa wide man turned up for training at the club's Bodymoor Heath complex wearing an outrageously flamboyant shirt and trouser combo. Shay Given certainly wasn't a fan of N'Zogbia's flowery ensemble, made worse by his decision to wear sunglasses in the dressing room. Charles N'Zogbia poses in his flowery outfit before Aston Villa training on Tuesday. N'Zogbia has featured regularly under Tim Sherwood since his appointment in February. N'Zogbia is no stranger to a garish outfit as seen here in a camouflage jump suit. Tim Sherwood became famous for wearing a gilet during his time as Tottenham manager last season. The Aston Villa goalkeeper took to Twitter to ridicule the Frenchman's choice of attire describing it as the 'the worst ever'. The Ireland international posted a picture of N'Zogbia on the social networking site writing 'OMG get on Charles N'Zogbia's gear. #wow #Worstever'. N'Zogbia has featured regularly under Sherwood since he was appointed in February, but after catching a glimpse of his outfit may have had a few choice words for the former Newcastle man. Villa moved six points clear of the Premier League relegation zone after Saturday's 1-0 win against Tottenham at White Hart Lane and face Liverpool in the FA Cup semi-final at Wembley next weekend. |
| | ChatGPT | Aston Villa footballer Carles N'Zogbia caused a stir when he turned up to training wearing an outrageous floral shirt and trousers combo, topped off with sunglasses in the dressing room. Even goalkeeper Shay Given ridiculed the outfit on Twitter, calling it "the worst ever". |
| | FTS-XL | Villa keeper Shay Given trolled Carles N'Zogbia's flowery outfit. |
| | FUDGE | Aston Villa's Carles N'Zogbia wore a garish outfit to training on Tuesday and Tim Sherwood slammed 'the worst ever' goalkeeper Shay Given. |
| | RIPA (MCTS) | Aston Villa's Carles N'Zogbia turned up for training on Tuesday wearing a flowery shirt and trouser combo. Shay Given took to Twitter to ridicule the Frenchman's choice of attire describing it as the 'worst ever'. |

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

The invention claimed is:

1. A computer-implemented model-agnostic natural language generation method, comprising:

providing an information-containing plain text prompt;

generating tokens based on the information-containing plain text prompt on an automated basis;

re-ordering the importance of each generated token and selecting the token with a highest knowledge groundedness in each scenario through a heuristic search process;

determining token-level hallucinations with a specifically trained knowledge classifier by identifying an inflection point of hallucination and replacing the re-ordered tokens after the inflection point of hallucination with further generated tokens; and generating a plain text response with the further generated tokens with the least hallucination and highest knowledge groundedness;

wherein the heuristic search process is a tree search comprising:

selecting a child node traversing down the tree from the root node through a Predictor+Upper Confidence bounds applied to Trees (PUCT) mechanism until a leaf node is reached;

expanding the leaf node until a terminal state is reached;

evaluating and generating approximated token-level knowledge groundedness scores of expansion outcomes of the leaf node;

backpropagating recursively the approximated token-level knowledge groundedness scores from the leaf node to the root node; and selecting the child node with highest approximated token-level knowledge groundedness scores for further traversing down the tree to reach the subsequent leaf node.

2. The computer-implemented model-agnostic natural language generation method of claim 1, wherein the trained knowledge classifier is obtained through a training process comprising:

providing a training example (y, x, k)~D;

swapping randomly a knowledge k with another knowledge k' from the knowledge source to form a negative example;

sampling a position $1<i<T$, where T is the length of y;

truncating the response y to i'th token and obtain $y_i$; and completing the sequence y; by sampling from $P_{LM}(y|x, y_i, k)$ by including the knowledge text k inside the instruction.

3. The computer-implemented model-agnostic natural language generation method of claim 2, wherein:

the tokens are labelled by starting with labelling tokens as positive;

the first hallucinated token is labelled as negative; and all tokens after the first hallucinated token are predictively labelled as negative.

* * * * *